United States Patent
Pulugurta (10) Patent No.: US 8,526,990 B1
(45) Date of Patent: Sep. 3, 2013

(54) DETERMINATION OF INITIAL TRANSMIT POWER BASED ON SHARED TRANSMIT-POWER INFORMATION

(75) Inventor: Srikanth Pulugurta, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 672 days.

(21) Appl. No.: 12/725,758

(22) Filed: Mar. 17, 2010

(51) Int. Cl.
*H04B 7/00* (2006.01)

(52) U.S. Cl.
USPC ............................. 455/522; 455/68; 455/69

(58) Field of Classification Search
USPC .......... 455/522, 67.11–70, 115.3, 126, 127.1, 455/127.2, 135, 226.3, 277.2, 296; 370/318
See application file for complete search history.

(56) References Cited

U.S. PATENT DOCUMENTS

| | | | | |
|---|---|---|---|---|
| 5,805,994 A * | 9/1998 | Perreault et al. | ........... | 455/435.1 |
| 6,374,117 B1 * | 4/2002 | Denkert et al. | ............... | 455/522 |
| 6,845,246 B1 | 1/2005 | Steer | | |
| 6,865,168 B1 * | 3/2005 | Sekine | ........................... | 370/335 |
| 6,876,868 B2 | 4/2005 | Crocker et al. | | |
| 7,099,678 B2 * | 8/2006 | Vaidyanathan | ............... | 455/500 |
| 7,583,976 B2 | 9/2009 | Batra et al. | | |
| 8,254,501 B2 * | 8/2012 | Suga et al. | ..................... | 375/340 |
| 2001/0000705 A1 * | 5/2001 | Olafsson | ....................... | 375/295 |
| 2002/0093918 A1 * | 7/2002 | Kim et al. | ...................... | 370/278 |
| 2004/0076125 A1 * | 4/2004 | Nakamura et al. | ............. | 370/318 |
| 2004/0136345 A1 * | 7/2004 | Yano et al. | ..................... | 370/335 |
| 2004/0198404 A1 * | 10/2004 | Attar et al. | ..................... | 455/522 |
| 2005/0093624 A1 * | 5/2005 | Forrester et al. | .............. | 330/129 |
| 2005/0143113 A1 * | 6/2005 | Lee et al. | ........................ | 455/522 |
| 2005/0239491 A1 * | 10/2005 | Feder et al. | .................... | 455/522 |
| 2006/0035660 A1 * | 2/2006 | Anderson | ....................... | 455/522 |
| 2006/0084444 A1 * | 4/2006 | Kossi et al. | ..................... | 455/450 |
| 2006/0270434 A1 * | 11/2006 | Iacono | ........................... | 455/522 |
| 2007/0104214 A1 * | 5/2007 | Hsieh et al. | .................... | 370/458 |
| 2007/0225027 A1 * | 9/2007 | Zhang | ............................ | 455/522 |
| 2007/0242621 A1 | 10/2007 | Nandagopalan et al. | | |
| 2008/0165697 A1 * | 7/2008 | Zeira et al. | ..................... | 370/252 |
| 2008/0259861 A1 * | 10/2008 | Kang et al. | ..................... | 370/329 |
| 2008/0293366 A1 * | 11/2008 | Haartsen | ......................... | 455/69 |
| 2009/0011786 A1 * | 1/2009 | Lee et al. | ........................ | 455/522 |
| 2009/0016266 A1 * | 1/2009 | Kim et al. | ...................... | 370/328 |
| 2009/0052371 A1 * | 2/2009 | Ariyur | ............................ | 370/318 |
| 2009/0061862 A1 | 3/2009 | Alberth, Jr. et al. | | |
| 2009/0143044 A1 * | 6/2009 | Thorson et al. | ............. | 455/404.1 |
| 2009/0270025 A1 * | 10/2009 | Kossi et al. | ................... | 455/3.01 |
| 2009/0280857 A1 | 11/2009 | Batra et al. | | |
| 2010/0067474 A1 * | 3/2010 | Vijayan et al. | ................ | 370/329 |
| 2010/0110999 A1 * | 5/2010 | Li et al. | ......................... | 370/329 |

(Continued)

*Primary Examiner* — Dominic E Rego (57) ABSTRACT

Methods and systems are disclosed herein that may be used to share transmit-power information between mobile stations. An exemplary method involves a first mobile station: (i) determining a verified transmit power (VTP) for the first mobile station; (ii) using the VTP to generate a transmit-power message, wherein the transmit-power message is usable to determine an initial transmit power (ITP) for the second mobile station; and (iii) the first mobile station sending the transmit-power message to at least the second mobile station. For instance, the first mobile station may set the ITP for the second mobile station equal to the VTP for the first mobile station, and include an indication of the ITP in the transmit-power message. Alternatively, the first mobile station may calculate the ITP for the second mobile station by adjusting its VTP according to the ratio of the distance between the second mobile station and the serving base station, and the distance between the first mobile station and the serving base station.

28 Claims, 7 Drawing Sheets

(56) References Cited

U.S. PATENT DOCUMENTS

| | | | |
|---|---|---|---|
| 2010/0118733 A1* | 5/2010 | Wu et al. | 370/254 |
| 2010/0265900 A1* | 10/2010 | Baldemair et al. | 370/329 |
| 2011/0003605 A1* | 1/2011 | Song et al. | 455/501 |
| 2011/0085497 A1* | 4/2011 | Fang et al. | 370/328 |
| 2011/0182280 A1* | 7/2011 | Charbit et al. | 370/350 |
| 2012/0149299 A1* | 6/2012 | Laish et al. | 455/9 |

\* cited by examiner

DETERMINATION OF INITIAL TRANSMIT POWER BASED ON SHARED TRANSMIT-POWER INFORMATION

BACKGROUND

Many people use mobile stations, such as cell phones and personal digital assistants (PDAs), to communicate with cellular wireless networks. These mobile stations and networks typically communicate with each other over a radio frequency (RF) air interface according to a wireless protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." Another CDMA protocol that may be used is known as Evolution Data Optimized (EV-DO), perhaps in conformance with one or more industry specifications such as IS-856, Rel. 0 and IS-856, Rev. A. Other protocols may be used as well, such as Global System for Mobile Communications (GSM), Time Division Multiple Access (TDMA), WiMax, and/or any others.

These networks typically provide services such as voice, Short Message Service (SMS) messaging, and packet-data communication, among others, and typically include a plurality of base stations, each of which provide one or more coverage areas, such as cells and sectors. These base stations are typically not associated with any subscriber or small group of subscribers in particular; rather, they are placed in publicly-accessible locations and are used by the service provider's customers generally, and their coverage areas collectively blanket cities, rural areas, etc. When a mobile station is positioned in one of these coverage areas, it can communicate over the air interface with the base station, and in turn over one or more circuit-switched and/or packet-switched signaling and/or transport networks to which the base station provides access. In such an arrangement, the base-station-to-mobile-station link is known as the forward link, while the mobile-station-to-base-station link is known as the reverse link.

When a mobile station seeks to, as examples, originate a communication session (e.g. a voice call) or respond to a page message from a base station, the mobile station sends one or more messages known as access probes to the base station over a reverse-link access channel. As part of this process, the mobile station determines a transmit power level at which to send communications to the base station.

More specifically, to arrive at an appropriate transmit power for communications, a mobile station typically determines an initial transmit power at which to send an initial access probe, and then transmits an access probe at the initial transmit power. If the base station does not acknowledge the initial access probe, the mobile station then re-transmits the access probe at an incrementally higher power level (e.g. 3 dB higher than the previous access probe). The mobile station repeats this process (i.e. incrementally increasing the power level and re-transmitting) until either receiving an acknowledgement from the base station or reaching a set number (e.g. five) of transmitted access probes. The mobile station may then wait a timeout period, and start again at the initial transmit power. The mobile station may repeat this entire cycle a set number of times (e.g. three) before concluding that the base station is not reachable, or perhaps waiting a longer timeout period before starting the entire sequence over. And other variations on this access-probe-sending sequence exist as well, as this description is merely an example.

OVERVIEW

In current implementations, the initial transmit power is typically determined by summing a set of values, all of which pertain to forward-link conditions and pilot-signal strength. For example, when preparing to send an access probe, a mobile station may sum (i) a value that reflects the power at which the mobile station is receiving transmissions from the base station on the forward link, (ii) one or more constants, and (iii) an interference-correction factor that is derived from the signal-to-noise ratio at which the mobile station is currently receiving a pilot signal from the base station.

There are drawbacks to the existing techniques for determining the initial transmit power. For instance, while access probes are transmitted over the reverse link access channel, the initial transmit power is calculated based on forward link parameters, relying on the assumption that conditions on the forward link and the reverse link are similar. In practice, however, reverse link conditions may differ from those on the forward link, and resulting inaccuracies may lead to inefficient use of reverse-link resources. For example, some mobile stations may transmit access probes with more power than is required to reach the base station. And repeated attempts to transmit an access probe, which occur when the calculated initial transmit power is too low, also increase congestion on the reverse-link. This effect may be amplified the more inaccurate a calculation is, as more attempts to transmit the access probe may be required before the access probe successfully reaches the base station.

Accordingly, exemplary methods and systems are described herein that may help improve the accuracy with which mobile stations determine the initial transmit power for an access probe, which in turn may result in more efficient utilization of reverse-link resources and/or a reduction in the number of access-probe transmission attempts, among other benefits. To do so, when a mobile station successfully connects and determines a transmit power for its communications, the mobile station may share this "verified" transmit power (VTP) with, or use its VTP to determine the initial transmit power for, nearby mobile stations. Since the verified transmit power accounts for actual reverse-link conditions in the coverage area, using the verified transmit power of another mobile station in the same coverage area may help a mobile station to calculate an initial transmit power that is more accurate (i.e., that is closer to the verified transmit power that the mobile station ultimately determines).

In one aspect, an exemplary method involves (i) at a first mobile station configured to operate in a radio access network, determining a verified transmit power (VTP) for the first mobile station; (ii) the first mobile station using the VTP to generate a transmit-power message, wherein the transmit-power message is usable to determine an initial transmit power (ITP) for the second mobile station; and (iii) the first mobile station sending the transmit-power message to at least the second mobile station.

In an exemplary embodiment, the step of using the VTP to generate a transmit-power message may involve using the VTP for the first mobile station as a basis for determining the ITP for use by the second mobile station, and the transmit-power message may therefore include an indication of the ITP for use by a second mobile station. In one such embodiment, determining the ITP for the second mobile station based on the VTP may involve setting the ITP for use by the second mobile station equal to the VTP. In other such embodiments, determining the ITP for the second mobile station based on the VTP may involve using (i) the VTP for the first mobile station, (ii) location information for the first mobile station, and (iii) location information for the second mobile station as a basis for determining the ITP for the second mobile station. For example, the first mobile station may (i) determine a first distance between the first mobile station and the base station; (ii) determine a second distance between the second mobile station and the base station; and (iii) use the ratio between the second distance and the first distance and the VTP for the first mobile station as basis for determining the ITP for the second mobile station (e.g., such as by weighting the VTP by the ratio between the second distance and the first distance).

Alternatively, the step of using the VTP to generate a transmit-power message may involve including an indication of the VTP (and possibly an indication of the location of the first mobile station as well) in the transmit-power message. A second mobile station that receives the transmit-power message can thereby use the VTP for the first mobile station as a basis for determining its ITP.

In a further aspect, another exemplary method involves (i) at a second mobile station configured to operate in a radio access network, receiving a transmit-power message that was transmitted from a first mobile station; (ii) the second mobile station using the transmit-power message as a basis for determining an initial transmit power (ITP); and (iii) the second mobile station transmitting an access probe at the ITP.

And in a further aspect, a system is disclosed, which includes: (i) data storage; (ii) at least one processor; and (iii) program logic stored in the data storage and executable by the at least one processor to: (a) cause a second mobile station to receive a transmit-power message that was transmitted by a first mobile station; (b) use the transmit-power message as a basis to determine an initial transmit power (ITP) for the second mobile station; and (c) cause the second mobile station to transmit an access probe at the determined ITP.

And in yet a further aspect, another system is disclosed, which includes: (i) data storage; (ii) at least one processor; and (iii) program logic stored in the data storage and executable by the at least one processor to: (a) determine a verified transmit power (VTP) for a first mobile station; (b) use the VTP as a basis to generate a transmit-power message, wherein the transmit-power message is usable by a second mobile station to determine an initial transmit power (ITP) for the second mobile station; and (c) cause the first mobile station to send the transmit-power message to at least the second mobile station.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

I. Exemplary Network Infrastructure

Exemplary embodiments of the present invention are described herein. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

Figure 1:
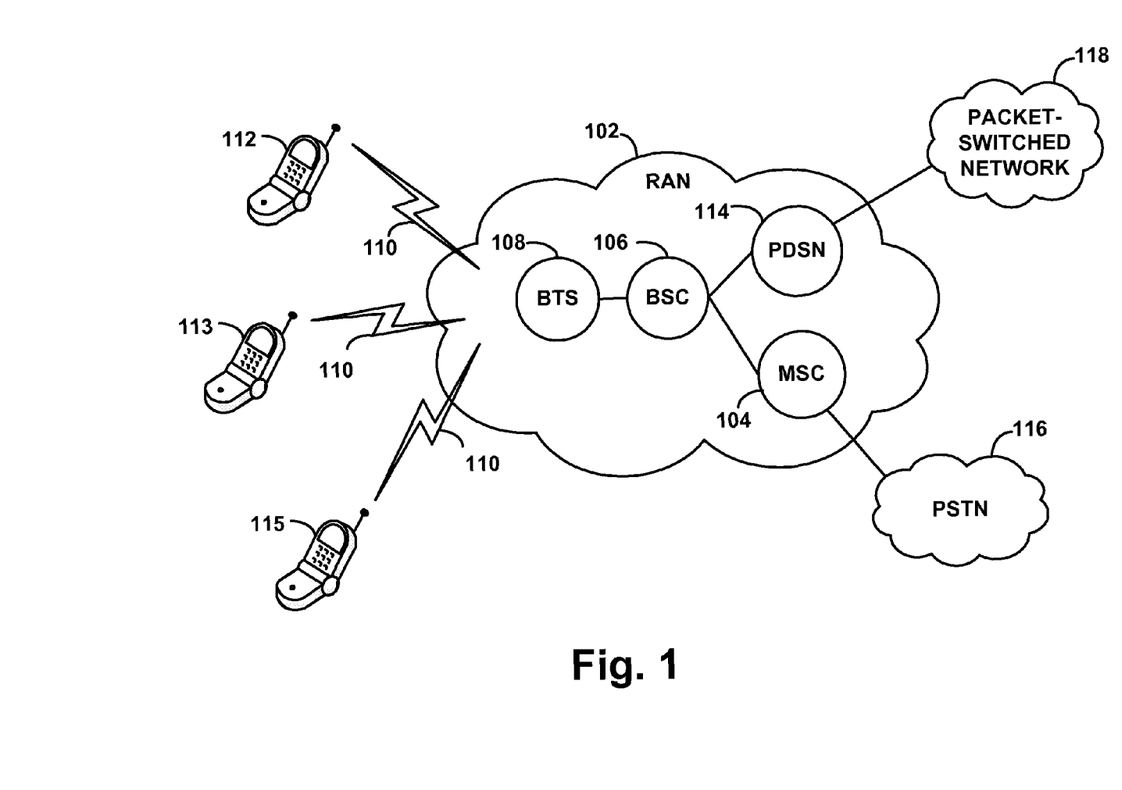
FIG. 1 is a simplified block diagram of a wireless communication system in which an exemplary system and method may be implemented.

Referring to the drawings, FIG. 1 is a simplified block diagram of a wireless communication system in which an exemplary method and system may be implemented. In such a wireless communication system, a wireless carrier typically operates a radio access network (RAN) 102, which is controlled by a switching entity such as a mobile switching center (MSC) 104. The MSC generally includes or connects with one or more base station controllers (BSCs) 106, which in turn connect with one or more base transceiver stations (BTSs) 108. Each BTS 108 conventionally includes a cell tower with one or more antennas that communicate with mobile stations 112, 113, 115 via air interfaces 110.

Communications between the RAN 102 and mobile stations 112, 113, 115 may occur in accordance with any air interface protocol now known or later developed. Examples of such protocols include CDMA (e.g., 1xRTT, 1xEV-DO), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, and infrared. Other protocols may also be employed.

With the illustrated configuration, RAN 102 may provide service in an area that is divided geographically into a number of cells, each defined by a radio frequency (RF) radiation pattern from a BTS 108. Furthermore, each cell may be subdivided into a number of sectors. For simplicity, references to a "sector" herein should be understood to include sectors, cells, and possibly other types of coverage areas as well. In general, air interface communications in each sector (or other such coverage area) of a cellular wireless communication system can be encoded or carried in a manner that distinguishes the communications in that sector from communications in adjacent sectors. For example, in a Code Division Multiple Access (CDMA) system, each sector has a respective pseudo-random noise offset or "PN offset" that is used to encode or modulate air interface communications in the sector distinctly from those in adjacent sectors. Analogously, in other air interface protocols, communications in one sector may be distinguished from those in other sectors by frequency, time, and/or various other parameters.

BTS 108 may be any network element arranged to carry out the BTS functions described herein. As such, BTS 108 may include a communication interface, a processor, and data storage comprising instructions executable by the processor to carry out those BTS functions. The communication interface may include one or more antennas, chipsets, and/or other components for providing one or more CDMA coverage areas such as cells and sectors, for communicating with mobile stations such as mobile station 112 over an air interface. The communication interface may also include one or more wired (e.g. Ethernet) and/or wireless (e.g. WiFi or WiMax) interfaces for communicating with at least BSC 106.

BSC 106 may be any network element arranged to carry out the BSC functions described herein. As such, BSC 106 may include a communication interface, a processor, and data storage comprising instructions executable by the processor to carry out those BSC functions. The communication interface may include one or more wired (e.g. Ethernet) and/or wireless (e.g. WiFi or WiMax) interfaces for communicating with at least BTS 108, and mobile switching center (MSC) 104. In general, BSC 106 functions to control one or more BTSs such as BTS 104, and to provide those one or more BTSs with connections to switches such as MSC 104 or a packet data serving node (PDSN) 114, for instance.

Note that the combination of BTS 108 and BSC 106 may be considered a base station. However, BTS 108 or BSC 106 could, taken alone, each be considered a base station as well.

Furthermore, a base station may be considered to be either or both of those devices, and perhaps make use of one or more functions provided by MSC 104, and/or other network entities.

MSC 104 and PDSN 114 may be any networking elements arranged to carry out the switch functions described herein. Thus, MSC 104 and/or PDSN 114 may include a communication interface, a processor, and data storage comprising instructions executable by the processor to carry out those switch functions. MSC 104 preferably functions to provide connectivity to a public-switched telephone network (PSTN) 116, while PDSN 114 preferably functions to provide connectivity to one or more packet-switched networks 118, such as the Internet. Accordingly, the communication interface of PDSN 114 may include one or more wired (e.g. Ethernet) and/or wireless (e.g. WiFi or WiMax) interfaces for communicating with at least BSC 106 and other entities via packet-switched network 118. Further, it should be understood that while MSC 104 and PDSN 114 are shown as separate entities, some or all of the functionality of these entities may be combined in a single switching entity.

Mobile stations 112, 113, 115 may be any type of mobile device arranged to carry out the mobile-station functions described herein. As examples, mobile station 112 could be a cell phone, a PDA, a computer, a laptop computer, a hybrid CDMA/EV-DO device, and/or a multi-mode cellular/Wi-Fi device. As such, a mobile station may include a user interface, a wireless-communication interface, a processor, and data storage comprising instructions executable by the processor for carrying out those mobile-station functions. The user interface may include buttons, a touchscreen, a microphone, and/or any other elements for receiving inputs, as well as a speaker, one or more displays, and/or any other elements for communicating outputs. Further, while the term "mobile station" is a term of art commonly used for such devices, the term "mobile station" should be understood to include non-mobile devices, such as a personal computer or any other device capable of the functionality of a mobile station described herein.

In another aspect, RAN 102 and mobile station 112 may be configured for Over-The-Air Service Provisioning (OTASP). OTASP allows service providers to communicate with a mobile station using a wireless network, such as the Internet, in order to add new types of services to the mobile station, rather than requiring that the customer to bring the mobile station to a service provider location (e.g., a storefront or service center) for reprogramming. Accordingly, mobile station 112 may be configured with the functionality described herein using OTASP.

II. Exemplary Systems

Figure 2:
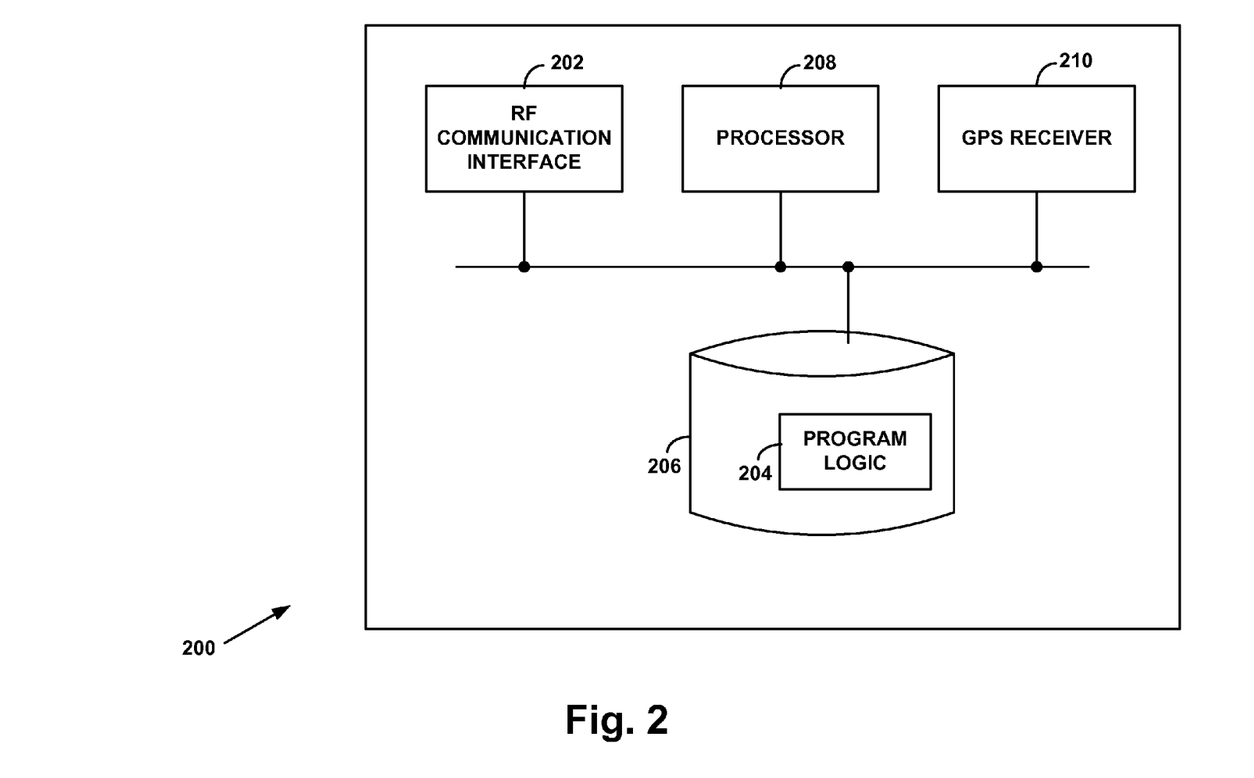
FIG. 2 is a block diagram illustrating a system according to an exemplary embodiment.

FIG. 2 is a block diagram illustrating a system according to an exemplary embodiment. An exemplary system may take the form of a mobile station, may be a component of a mobile station, or may be a standalone system in communication with a mobile station. For purposes of example in FIG. 2, the exemplary system takes the form of a mobile station 200. By way of example, mobile station 200 could be a cell phone, wirelessly equipped personal digital assistant (PDA), or any other type of wirelessly-equipped device now known or later developed. Further, it should be understood that while the term "mobile station" is a term of art commonly used for devices that are capable of wireless communications, the term "mobile station" should be understood to include non-mobile devices, such as a personal computer or any other device capable of the functionality of a mobile station described herein.

The mobile station 200 is preferably equipped with hardware, software, and/or other logic to communicate with a RAN in accordance with an agreed communication protocol, such as one of the protocols noted herein for instance. For example, mobile station 200 may include a radio frequency (RF) communication interface 202 that functions to facilitate air interface communications with a RAN according to one or more protocols such as those noted above. More generally, the communication interface 202 may be able to communicate with one or more of various types of networks and devices, such as EV-DO networks, Wi-Fi networks, Bluetooth devices, and/or one or more additional types of networks and devices.

Mobile station 200 may also include program logic 204 stored in data storage 206 (e.g., one or more volatile and/or non-volatile storage components of the mobile station, such as magnetic, optical, or organic storage components) and executable by one or more processors 208 (e.g., general purpose and/or special purpose processors) to carry out the various mobile-station functions described herein. In general, the processor 208 and data storage 206 may be any suitable components known to those of skill in the art.

Furthermore, mobile station 200 is preferably configured to determine location information that is indicative of its location. Accordingly, mobile station 200 may also include a GPS receiver 210. Further, mobile station 200 may include program logic 204 that when executed by processor 208 can operate the GPS receiver 210 to receive GPS location data from one or more GPS satellites, which may be used to determine the location of the mobile station 200 (or may simply indicate the location in and of itself). Accordingly, the wireless communication device may utilize the World Geodetic System WGS84 coordinate system or any other appropriate coordinate system, to specify its location.

Additionally or alternatively, mobile station 200 may include program logic 204, or possibly a separate chipset, which is configured for location-determination techniques other than using GPS (possibly combining such techniques with GPS). For example, mobile station 200 may be configured to determine its location using techniques such as Advanced Forward Link Trilateration (AFLT), Enhanced Forward Link Triangulation (EFLT), Time Difference On Arrival (U-TDOA), Cell Identification (CID), Enhanced Cell Identification (E-CID), and/or Angle of Arrival (AOA), among others.

In a further aspect, mobile station 200 may be configured to determine the transmit power at which it will communicate with a given base station. To do so, mobile station 200 may determine an initial transmit power (ITP) and initially send an access probe at the ITP. Then, if no acknowledgement is received, mobile station 200 may increase its transmit power and retransmit the access probe until either an acknowledgment is received, or the attempt to connect is deemed to have failed (e.g., after a certain number of attempts or a predetermined timeout period).

Mobile station 200 may be configured to determine its ITP using various techniques. For example, according to IS-2000, the mobile station uses the mean input power (mean_input_pwr), a PCS correction (Correction_PCS), and an interference correction (Interference_Correction) to determine initial-access-probe power (IP). The interference correction is defined as:

Interference_Corr=min(max(-7-$E_c/I_0$,0),7)).

Further, a nominal power parameter (Nom_Pwr), a nominal power extension parameter (Nom_Pwr_Ext), and an Initial Power parameter (Init_Pwr) are also provided to adjust the IP calculation. The PCS correction is defined as:

Correction_PCS=Nom_Pwr-(16*Nom_Pwr_Ext)+Init_Pwr

Thus, under IS-2000, ITP is calculated in decibels (dB) as:

ITP=-(mean_input_pwr)-76+Correction_PCS+Interference_Corr=-(mean_input_pwr)-76+Nom_Pwr-(16*Nom_Pwr_Ext)+Init_Pwr+Interference_Corr In practice, existing IS-2000 mobile stations typically use a Received Signal Strength Indicator (RSSI) as the mean input power, and typically set Nom_Pwr_Ext to be equal to zero. Further, the initial power parameter may also be referred to as the Probe Adjust Power (Probe_Pwr_Adj). Yet further, the interference correction may be based on the interference experienced on the forward link ($E_c I_o$), and thus may also be referred to as the $E_c/I_o$ Correction ($E_c/I_o$_Correction). As such, an IS-2000 mobile station may calculate initial-access-probe power according to the following:

ITP=-(RSSI)-76+(Nom_Pwr)+Probe_Adj_Pwr+$E_c/I_o$_Correction

In this equation, the RSSI is typically an indication of received signal strength at the mobile station, as measured by the mobile station. The Nominal Power (Nom_Pwr) is typically a network setting that is determined by the BSC or another network entity and relayed to mobile stations via BTSs, which in practice is typically a constant value from zero and three. Nom_Pwr is typically provided to a mobile station in a page message that is transmitted when the mobile station powers on, but may be provided using other techniques as well. Probe_Adj_Pwr is typically a constant that is predefined by the service provider.

According to an exemplary embodiment, mobile station 200 is additionally or alternatively configured to coordinate with other mobile stations to determine its ITP and/or to assist other mobile stations in determining their respective ITPs. In particular, once mobile station 200 has determined a VTP for communication with a given base station (i.e., the transmit power used when an acknowledgement is successfully received from the base station), this transmit power may be considered a "verified" transmit power (VTP) for mobile station 200. Mobile station 200 may use the VTP to generate a transmit-power message, and then send the transmit-power message to other nearby mobile stations to provide these mobile stations with, or assist these mobile stations in determining, their respective ITPs.

In an exemplary embodiment, mobile station 200 may use its VTP to determine an ITP that should be used by a nearby mobile station, and then include an indication of the ITP for use by the nearby mobile station in the transmit-power message. For example, mobile station 200 may determine that nearby mobile stations should use its VTP as the nearby mobile stations ITP, and thus set the ITP in the transmit-power message to be its VTP. This technique may be employed for mobile stations that are close enough (e.g., within range or within a predetermined distance (e.g., 100 ft,) of the mobile station), which may be selected that using the VTP of mobile station 200 will likely be more accurate than using the standard IS-2000 technique or other techniques for calculating ITP. As another example, mobile station 200 may use: (i) the VTP for the first mobile station, (ii) location information for the first mobile station, and (iii) location information for the second mobile station as a basis for determining the ITP for the second mobile station to determine an ITP for a nearby mobile station. By doing so, mobile station 200 may determine the ITP for a nearby mobile station by weighting its VTP by the ratio of its distance to the base station as compared to the nearby mobile station's distance to the base station.

In an alternative embodiment, mobile station 200 may include an indication of the VTP for mobile station 200, rather than of the ITP for the nearby mobile station. In such embodiments, the functionality of determining the ITP for the nearby mobile station is moved from mobile station 200, to the nearby mobile station. Further, in such embodiments, mobile station 200 may also determine its location, and include location data indicating its location in the transmit-power message. A nearby mobile station receiving the transmit-power message may then determine its ITP by comparing its distance to the base station to the distance between mobile station 200 and the base station, and adjusting the received VTP based on the relative distance to the base station.

To communicate transmit-power messages to other mobile stations, mobile station 200 may be configured to communicate with other mobile stations using various protocols. Preferably, mobile station 200 uses Bluetooth, 802.11, WiMAX or another such protocol that does not involve CDMA communications with the RAN, and preferably does not include the RAN in the communication path with the other mobile station. As such, nearby mobile stations can receive the transmit-power message before connecting to the RAN. It should be understood, however, that in other scenarios, transmit-power messages may be communicated between mobile stations via the RAN, without departing from the scope of the invention.

In a further aspect, mobile station 200 may also be configured to receive transmit-power messages from other mobile stations, which each may provide an indication of the ITP to be used by mobile station 200, or an indication of the VTP for the other mobile station, and possibly location information for the other mobile station as well (from which mobile station 200 can determine its own ITP). In the event the mobile station 200 receives another mobile stations' VTP in a transmit-power message (rather than an instruction to use a specific ITP that has been calculated for it), mobile station 200 may then determine its location, and use (i) the received indication of the VTP determined by the first mobile station, (ii) the location information for the other mobile station, and (iii) its location as a basis to determine the ITP at which it should transmit an access probe.

As a specific example, the mobile station 200 may determine the distance between it and the serving base station ($D_1$), the distance between the other mobile station and the base station ($D_2$), and the ratio between these distances ($D_1/D_2$).

Mobile station 200 may then adjust the VTP of the other mobile station by this ratio in order to determine its own ITP, such as by multiplying the VTP by the ratio $D_1/D_2$. The mobile station may then use the determined ITP as the starting point to determine the transmit power for its communications with the base station.

In an exemplary embodiment, mobile station 200 preferably uses ITPs determined for it by other nearby mobile stations or determines its ITP based on VTPs of other mobile stations, rather than using a technique such as that specified under IS-2000. Accordingly, in a further aspect, when mobile station 200 seeks to establish a connection with a base station, the mobile station may first listen for a transmit-power message, which it can use to determine an ITP. If a transmit-power message is available from another mobile station being served by the base station to which the mobile station is attempting to connect, then mobile station 200 uses this transmit-power message to determine an ITP with which to send an access probe. If, on the other hand, a transmit-power message is not available, then the mobile station may use another technique, such as the IS-2000 technique, to determine an ITP.

In some embodiments, mobile station 200 may listen and/or search for transmit-power messages on an as-needed basis, whenever the mobile station is about to send an access probe. Alternatively, mobile station 200 may routinely listen and/or search for transmit-power messages independent from a particular attempt to connect. By doing so, mobile station 200 may update and store its ITP from time-to-time based on received transmit-power messages, so ITP value may be predetermined when the mobile station needs to send an access probe. As such, when mobile station 200 needs to send an access probe, it may first check whether it has determined and stored an ITP value (and possibly whether a stored ITP is valid or expired). Then, if mobile station 200 has not already determined ITP (or the ITP is expired), mobile station 200 may search for a transmit-power message from another mobile station.

When mobile station 200 uses a VTP received from another mobile station to determine its own ITP, and in turn uses its ITP to determine its own VTP, mobile station 200 may then use its VTP to create and broadcast its own transmit-power message to other nearby mobile stations. Alternatively or additionally, when mobile station 200 receives a transmit-power message, mobile station 200 may rebroadcast the transmit-power message for nearby mobile stations (thus sharing another mobile station transmit-power information with nearby mobile stations). In either case, by sharing transmit-power information between mobile stations, mobile station 200 and other nearby mobile stations can coordinate to determine their respective ITPs, based solely on information provided by other mobile stations. Thus, in theory, it is only necessary for a single mobile station in a given coverage area (or any other type of defined geographic area) to initially use IS-2000 or another such technique to calculate ITP (of course, in practice, it should be understood that this may not be the case). Since using shared VTP information may result in ITP being more accurate, the overall number of access-probe transmission attempts may be reduced, which in turn may reduce usage of reverse-link resources for repeated access probe attempts.

III. Exemplary Methods

Figure 3:
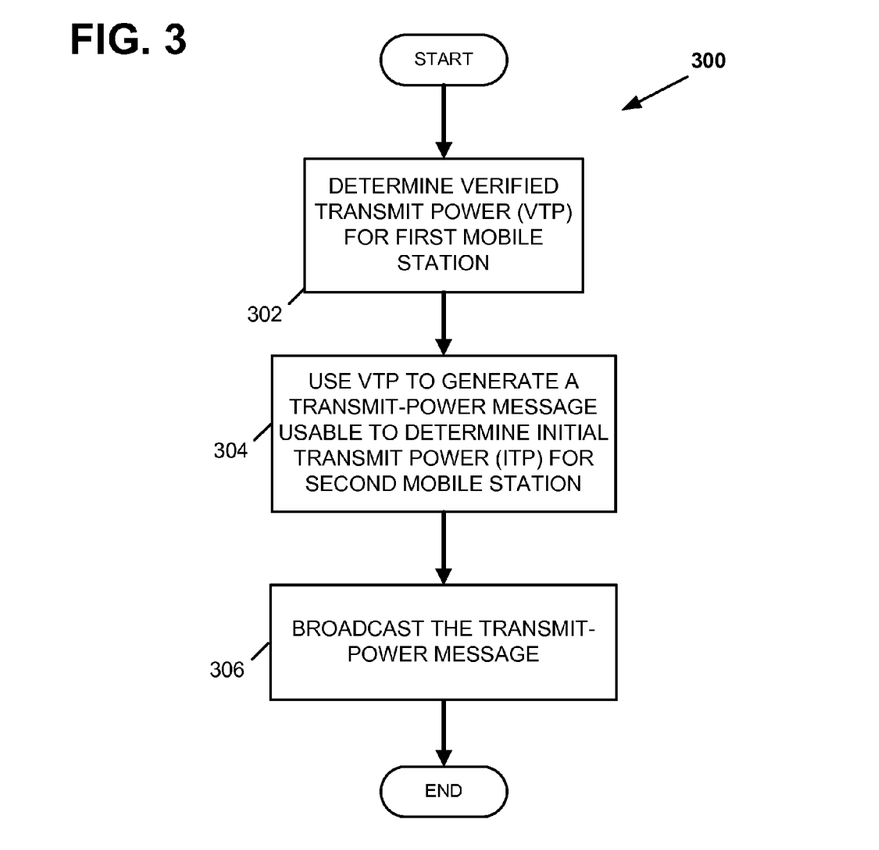
FIG. 3 is a flow chart illustrating a method according to an exemplary embodiment.

FIG. 3 is a flow chart illustrating a method 300 according to an exemplary embodiment. Method 300 is preferably carried out by a first mobile station, or a system within or associated with a first mobile station, in order to share transmit-power information with nearby mobile stations. As shown in block 302, the method involves the first mobile station determining the verified transmit power (VTP) for the first mobile station. The first mobile station then uses the VTP to generate a transmit-power message, which is usable to determine to determine the initial transmit power (ITP) for a second mobile station, as shown by block 304. The first mobile station then broadcasts the transmit-power message, as shown by block 306.

The step of using VTP to generate a transmit-power message, as shown in block 304, may be implemented in various ways. For example, the first mobile station may use its VTP as a basis for determining the ITP for use by the second mobile station, and include an indication of the determined ITP in the transmit-power message. Alternatively, the first mobile station may include an indication of its VTP in the transmit-power message (possibly with location information indicating its location as well), rather than an indication of ITP for the second mobile station, thus transferring the functionality of determining the ITP to the second mobile station, which receives the transmit-power message.

In embodiments where the first mobile station determines the ITP for the second mobile station, and includes an indication of the ITP in a transmit-power message, the ITP may be calculated using various techniques. As one example, the first mobile station may simply set the ITP for the second mobile station equal to its own VTP. As another example, the first mobile station may use: (i) the VTP for the first mobile station, (ii) location information for the first mobile station, and (iii) location information for the second mobile station to adjust its VTP according to the ratio of the distance between the second mobile station and the serving base station, and the first mobile station and the serving base station.

Figure 4:
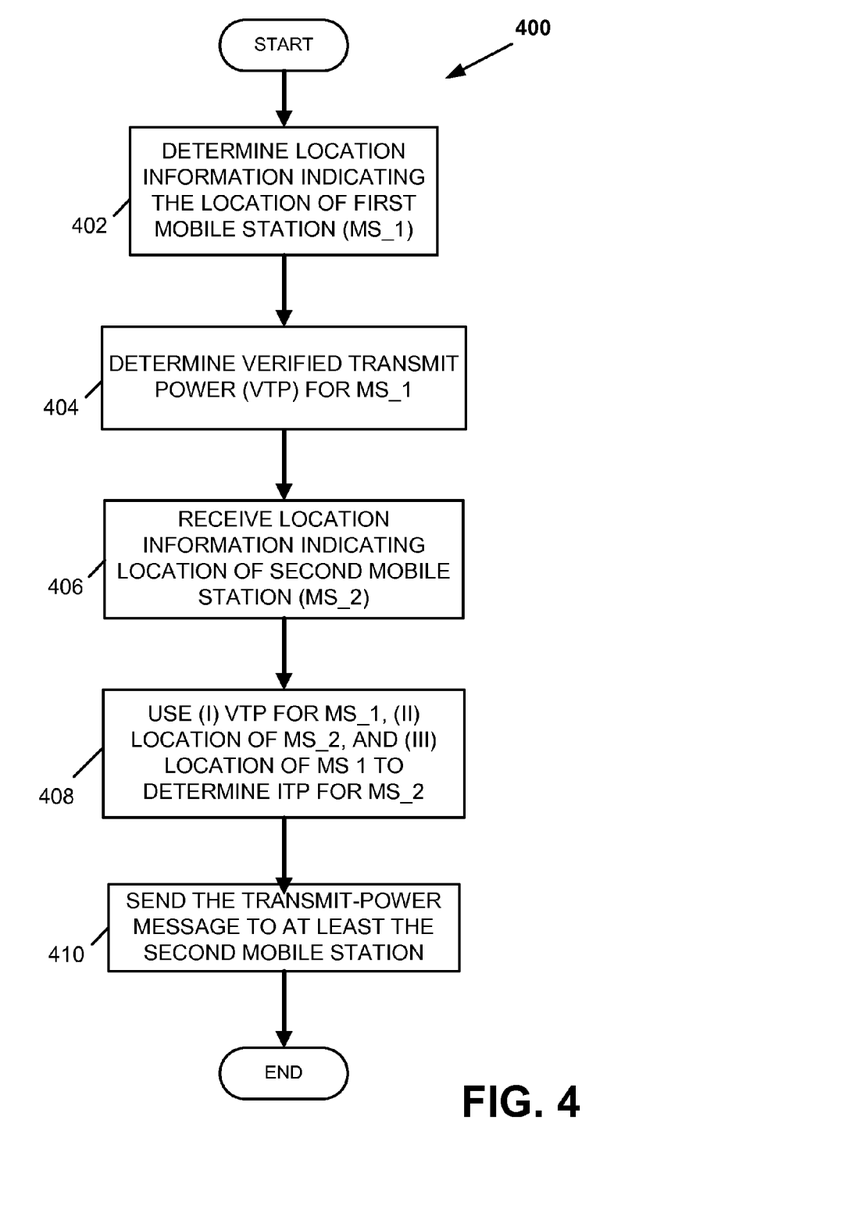
FIG. 4 is another flow chart illustrating a method according to an exemplary embodiment.

FIG. 4 is another flow chart illustrating a method 400 according to an exemplary embodiment. Method 400 illustrates an embodiment where the first mobile station determines the ITP for a second mobile station by adjusting its VTP according to the ratio of the distance between the second mobile station and the serving base station, and the distance between the first mobile station and the serving base station.

As shown in block 402, method 400 involves the first mobile station determining location information indicating the location of the first mobile station. The first mobile station also determines its VTP, as shown by block 404. The VTP may be determined using an ITP calculated according to IS-2000, an ITP calculated using transmit-power messages from other mobile stations, or an ITP calculated using any other appropriate technique. Additionally, the first mobile station receives location information indicating the location of the second mobile station, as shown by block 406. The location information for the second mobile station is preferably provided to the first mobile station by the second mobile station using one of the various mobile-station-to-mobile-station communication techniques described herein. The first mobile station then uses (i) its VTP as determined in block 404, (ii) the location of the second mobile station, and (iii) its location information as determined in block 402, in order to determine the ITP that should be used by the second mobile station, as shown by block 408. The first mobile station then sends a transmit-power message to at least the second mobile station, as shown in block 410.

In an exemplary embodiment, to determine the ITP for the second mobile station as shown in block 408, the first mobile station may use its location and the location of the serving base station to determine a first distance ($D_{MS1}$) between the first mobile station and the serving base station. The first mobile station also uses the received location information for the second mobile station to calculate a second distance ($D_{MS2}$) between the second mobile station and the serving base station. The first mobile station then determines the ratio of the second distance as compared to the first distance ($D_{MS2}/D_{MS1}$), and calculates ITP for the second mobile station by weighting its VTP ($VTP_{MS1}$) by this ratio. For example, the first mobile station may calculate ITP for the second mobile station ($ITP_{MS2}$) as:

$$ITP_{MS2} = (D_{MS2}/D_{MS1}) * VTP_{MS1}$$

It should be understood that variations on this technique for determining ITP, which may incorporate other factors, are also possible.

Figure 5:
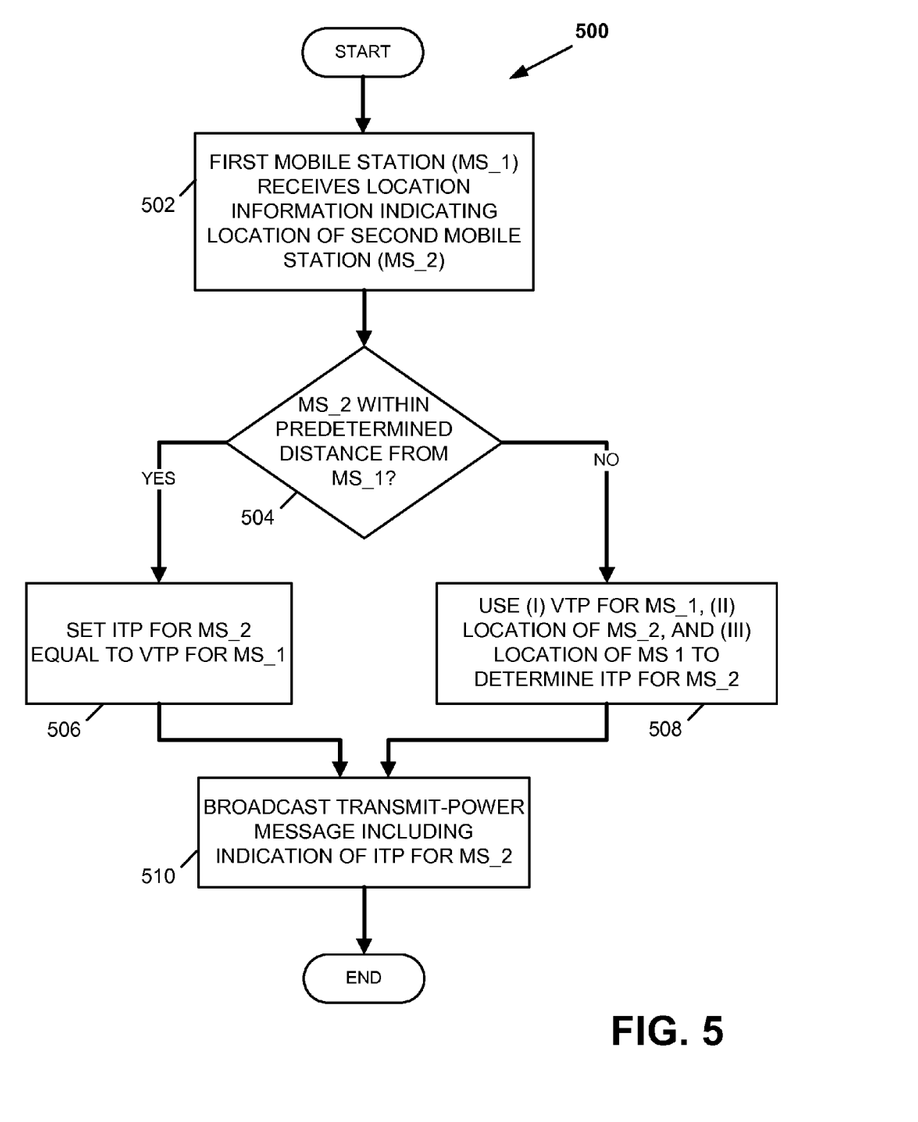
FIG. 5 is another flow chart illustrating a method according to an exemplary embodiment.

FIG. 5 is another flow chart illustrating a method 500 according to an exemplary embodiment. Method 500 illustrates an embodiment where the first mobile station uses its VTP to determine the ITP for a second mobile station, and includes an indication of that ITP in a transmit-power message. Further, in this embodiment, the first mobile station uses one of two techniques to determine an ITP that should be used by a second mobile station (e.g., either setting the ITP equal to its own VTP, or using a method such as method 400 of FIG. 4), depending upon the proximity of the second mobile station to the first mobile station.

More specifically, in method 500, the first mobile station initially receives location information (e.g., GPS coordinates) indicating the location of the second mobile station, as shown by block 502. The first mobile station then makes a determination as to whether or not the second mobile station is within a predetermined distance from the first mobile station, as shown by block 504. If the second mobile station is within the predetermined distance, then the first mobile station sets the ITP for use by the second mobile station equal to the VTP, as shown by block 506. If, on the other hand, the second mobile station is not within the predetermined distance, then the first mobile station uses (i) the VTP for the first mobile station, (ii) the location of the first mobile station, and (iii) the location of the second mobile station to determine the ITP for the second mobile station, as shown in block 508. In either case, once ITP is determined, the first mobile station broadcasts a transmit-power message that includes an indication of the ITP for the second mobile station, as shown by block 510. For example, the first mobile station may calculate ITP using a technique such as method 400 of FIG. 4.

Method 500 takes advantage of the recognition that two mobile stations may be located close enough to each other (e.g., within the broadcast range or predetermined distance of each other), and experience similar-enough reverse-link conditions, that the transmit power for both mobile stations is likely to be similar. In this scenario, the VTP determined by the first mobile station is likely to be close to (or possibly even the same as) the VTP that will ultimately determined by the second mobile station. Thus, by setting the ITP for the second mobile station to equal the VTP for the first mobile station, it is hoped that the ITP will be very close to (or possibly even equal to) the VTP that is ultimately determined by the second mobile station. Accordingly, where it is determined that the second mobile station is close enough to the first mobile station, the first mobile station may simplify the process of determining ITP for the second mobile station by setting the ITP equal to its own VTP.

Setting the ITP for the second mobile station equal to the VTP of the first mobile station, such as in block 506, may also provide the benefit of determining the ITP for the second mobile station, independent of the location of the serving BTS. Specifically, the alternative technique of weighting the VTP by the ratio of mobile-station distances to the serving base station involves determining the distances from each mobile station to the BTS. The first mobile station may determine its distance to the BTS by calculating round-trip delay to and from the BTS, or may obtain the GPS coordinates of the BTS, and calculate the distance between its GPS coordinates and those of the BTS. For the second mobile station, however, which is net yet connected to the BTS, round-trip delay is not an option. Therefore, the first mobile station may use the GPS coordinates of the BTS, along with the GPS coordinates of the second mobile station, to determine the distance between the second mobile station and the BTS. This implementation may require a modification to some existing BTSs to broadcast their GPS coordinates. Therefore, calculating the ITP for the second mobile station, without using the ratio of mobile-station distances to the BTS, may avoid the need to modify existing BTSs.

As noted, when the second mobile station is not close enough, another technique may be used to determine the ITP for the second mobile station, such as weighting the VTP by the ratio of the distances of the mobile stations to the base station. Alternatively, when the second mobile station is not within the predetermined distance from the first mobile station, the first mobile station may send a transmit-power message indicating simply that the second mobile station should use a standard technique to determine its ITP, or that simply indicates that the first mobile station cannot provide an ITP for the second mobile station. As another alternative, when the second mobile station is not within the predetermined distance, the first mobile station may simply refrain from transmitting a transmit-power message. In both cases, the need to use the BTS's GPS coordinates to determine ITP may be eliminated altogether.

Furthermore, it should be understood that there is no defined requirement for the distance at which a mobile station should begin using the latter technique (e.g., using the locations of the mobile station to determine the relative distances from the base station, and weighing VTP accordingly). However, there is a tradeoff between the range over which a given mobile station may use a simplified transmit power message and the accuracy of using the VTP for the first mobile station as an estimation of the VTP that will ultimately be determined by the second mobile station. Accordingly, it is contemplated that the threshold proximity of the first and second mobile stations to each other may be selected as a matter of engineering design choice.

Figure 6:
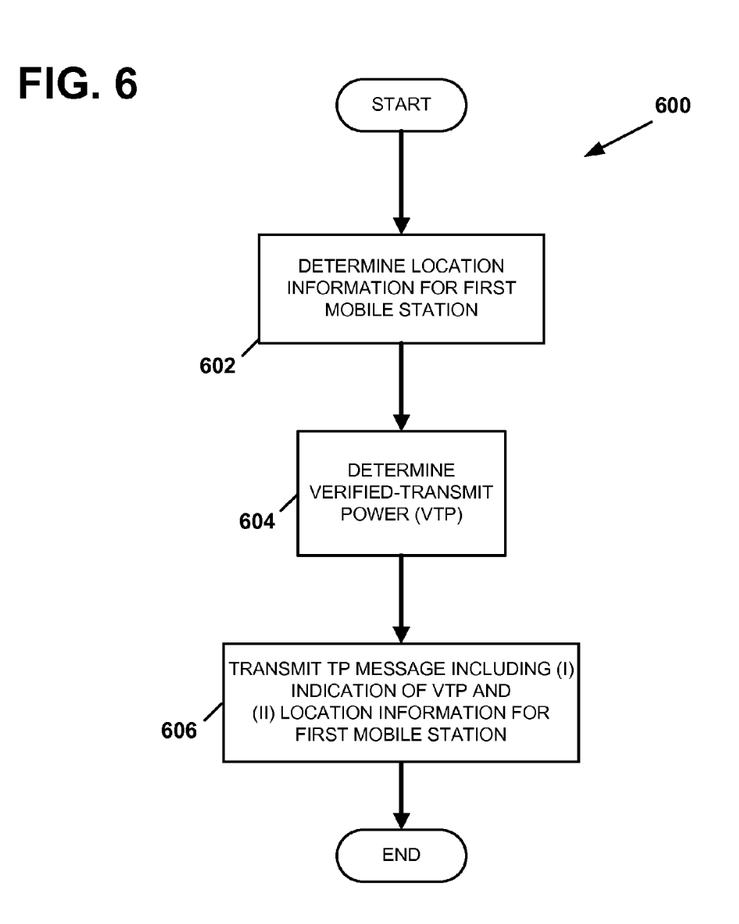
FIG. 6 is a flow chart illustrating a method in which the functionality of determining initial transmit power is shifted to the second mobile station that receives a transmit-power message from the first mobile station, according to an exemplary embodiment.

As noted, rather than determine the ITP for the second mobile station, the first mobile station may include an indication of its VTP (and possibly an indication of its location) in a transmit-power message, and the second mobile station receiving the message may then determine its own ITP based on the VTP of the first mobile station. FIG. 6 is another flow chart illustrating a method 600 according to an exemplary embodiment in which the functionality of determining the ITP is shifted to the second mobile station that receives the transmit-power message from the first mobile station. Method 600 is preferably carried out by the first mobile station to send a transmit-power message including its VTP to a second mobile station, which can be used by the second mobile station to determine its ITP.

More specifically, as shown in block 602, method 600 involves the first mobile station determining its own location. The first mobile station also determines a VTP for the first mobile station (i.e., the access-probe transmit power at which the first mobile receives an acknowledgement), as shown by block 604. The VTP may be determined using an ITP calculated according to IS-2000, an ITP calculated using transmit-power messages from other mobile stations, or an ITP calculated using any other appropriate technique. The first mobile station then transmits a transmit-power message, as shown in block 606. The transmit-power message preferably includes (i) an indication of the VTP and (ii) the determined location information for the first mobile station. Accordingly, the transmit-power message is usable by a second mobile station that receives the transmit-power message to determine ITP for the second mobile station.

The first mobile station and/or the second mobile station may determine their respective locations using various techniques or combinations of techniques. For example, each mobile station may simply determine its GPS coordinates, use a triangulation-based method, or use an advanced technique such as AFLT, EFLT, U-TDOA, etc. In general, it should be understood that an exemplary method may involve any type of location-determination technique now known or yet to be discovered, without departing from the scope of the invention.

The first mobile station then includes its location information in a transmit-power message for nearby mobile stations. For example, the included location information may be GPS coordinates and/or other information identifying the geographic location of the first mobile station, which the second mobile station can use to determine the distance between the first mobile station and the serving base station. Additionally or alternatively, the first mobile station may itself calculate its distance to the serving base station and include this distance in the transmit-power message.

The first mobile station may broadcast the transmit-power message so that it is available to a second mobile station, or possibly to any mobile station, that is nearby. For example, the first mobile station may transmit the transmit-power message to some or all other mobile stations operating in the coverage area served by the same base station that is serving the first mobile station. This coverage area may be a sector, a group of sectors served by a common base station, a subsection of a sector, or an area defined in another manner. Alternatively, the mobile station may broadcast the transmit-power message with a predetermined power, or a power level that is determined as a matter of engineering design choice. Preferably, the transmit-power message is broadcast or transmitted using a protocol for mobile-station-to-mobile-station communication that does not involve the RAN in its communication path, such as Bluetooth, 802.11, etc. (Note that herein, a "transmission" and a "broadcast" of a transmit-power message are considered to be interchangeable, both including instances where the transmit-power message transmitted to a particular mobile station or mobile stations, and instances where the transmit-power message is generally broadcast by a mobile station.)

Figure 7:
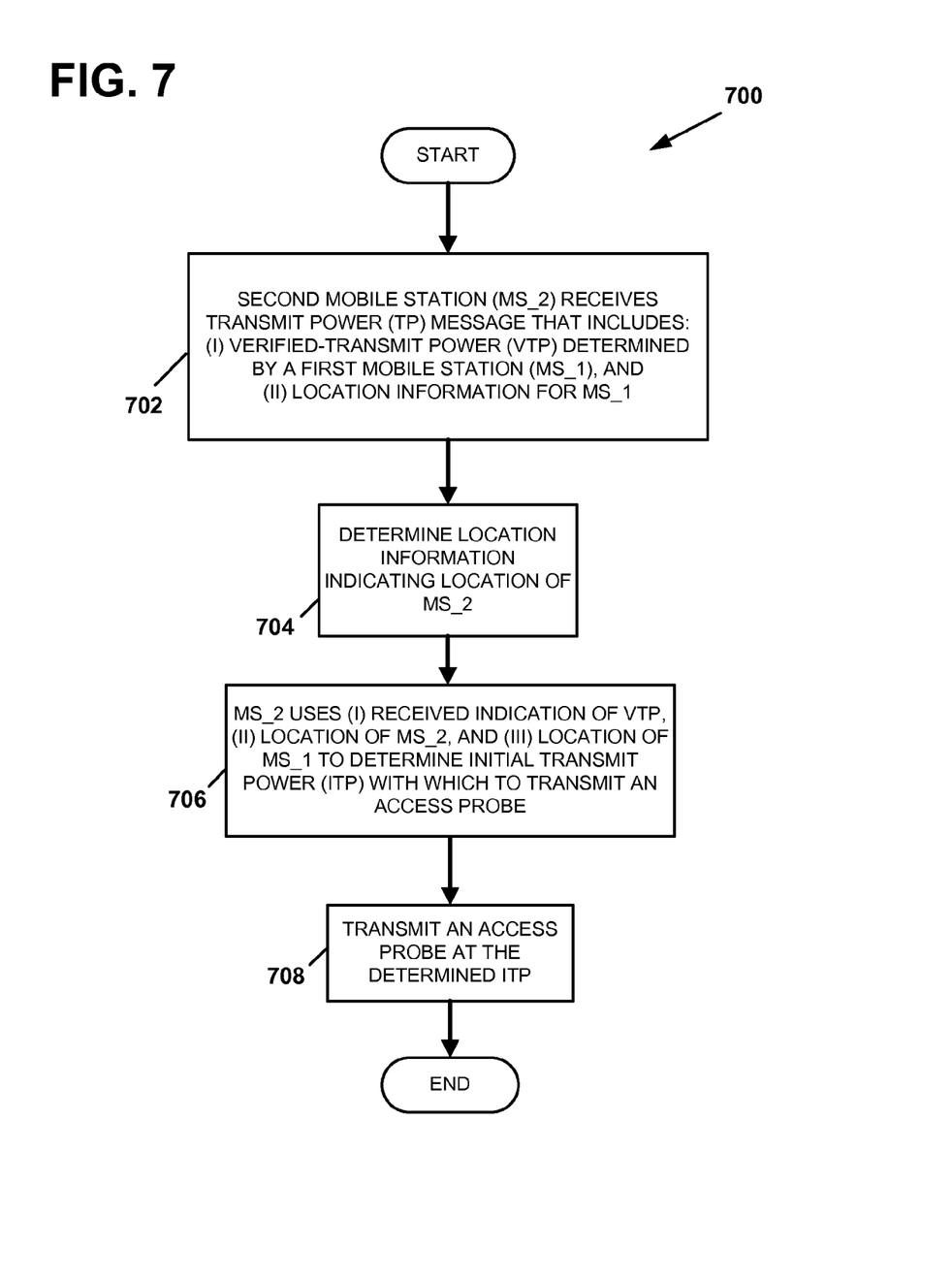
FIG. 7 is another flow chart illustrating a method in which the functionality of determining initial transmit power is shifted to the second mobile station that receives a transmit-power message from the first mobile station, according to an exemplary embodiment.

FIG. 7 is another flow chart illustrating a method 700 according to an exemplary embodiment, in which the functionality of determining the ITP is shifted to the second mobile station receiving the transmit-power message. Method 700 is preferably carried out by the second mobile station, or a system within or associated with the second mobile station, in order to use shared transmit-power information received in a transmit-power message from a first mobile station, in order to calculate its own ITP. Method 700 involves the second mobile station receiving a transmit-power message that was transmitted by a first mobile station, as shown by block 702. The transmit-power message preferably includes an indication of a VTP determined by the first mobile station (i.e., the VTP used by the first mobile station), and location information for the first mobile station. In addition, the second mobile station determines location information indicating its location, as shown by block 704. The second mobile station then uses: (i) the received indication of the VTP determined by the first mobile station, (ii) the received location information for the first mobile station, and (iii) the determined location information for the second mobile station as a basis for determining an ITP with which to send an access probe, as shown by block 706. The method may further involve the second mobile station transmitting an access probe at the ITP for the second mobile station, as shown by block 708, to thereby begin the process of determining its own VTP.

Exemplary embodiments of the present invention have been described above. It should be understood the word "exemplary" is used herein to mean "serving as an example, instance, or illustration." Any embodiment described herein as "exemplary" is not necessarily to be construed as preferred or advantageous over other embodiments. In addition, those skilled in the art will understand that changes and modifications may be made to these exemplary embodiments without departing from the true scope and spirit of the invention, which is defined by the claims.

I claim:

1. A method comprising:
at a first mobile station configured to operate in a radio access network, determining a verified transmit power (VTP) for the first mobile station, wherein determining the VTP for the first mobile station comprises:
transmitting an access probe to a base station in the radio access network and waiting for an acknowledgement from the base station, wherein transmit power of the access probe is initially set at a predetermined ITP;
if the acknowledgement is not received from the base station within the predetermined period of time, then repeatedly (i) increasing the transmit power, (ii) re-transmitting the access probe to the base station, and (iii) waiting the predetermined period of time, until the acknowledgement is received from the base station; and
determining the VTP to be the transmit power of the access probe when the acknowledgement is received from the base station;
the first mobile station using the VTP to generate a transmit-power message, wherein the transmit-power message is usable to determine an initial transmit power (ITP) for the second mobile station; and
the first mobile station sending the transmit-power message to at least the second mobile station.

2. The method of claim 1, wherein using the VTP to generate a transmit-power message comprises using the VTP for the first mobile station as a basis for determining the ITP for use by the second mobile station, wherein the transmit-power message comprises an indication of the ITP for use by a second mobile station.

3. The method of claim 2, wherein using the VTP for the first mobile station as a basis for determining the ITP for use by the second mobile station comprises setting the ITP for use by a second mobile station equal to the VTP.

4. The method of claim 2, wherein using the VTP for the first mobile station as a basis for determining the ITP for use by the second mobile station comprises using (i) the VTP for the first mobile station, (ii) location information for the first mobile station, and (iii) location information for the second mobile station as a basis for determining the ITP for the second mobile station.

5. The method of claim 4 wherein using (i) the VTP for the first mobile station, (ii) location information for the first mobile station, and (iii) location information for the second mobile station as a basis for determining the ITP for the second mobile station comprises:

determining a first distance between the first mobile station and the base station;

determining a second distance between the second mobile station and the base station; and using (a) a ratio between the second distance and the first distance and (b) the VTP for the first mobile station as basis for determining the ITP for the second mobile station.

6. The method of claim 2, wherein using the VTP for the first mobile station as a basis for determining the ITP for use by the second mobile station comprises:

making a determination as to whether or not the second mobile station is within a predetermined distance from the first mobile station;

if the determination is that the second mobile station is within the predetermined distance, then setting the ITP for use by a second mobile station equal to the VTP; and if the determination is that the second mobile station is not within the predetermined distance, then using (i) the VTP for the first mobile station, (ii) location information for the first mobile station, and (iii) location information for the second mobile station as a basis for determining the ITP for the second mobile station.

7. The method of claim 1, wherein the transmit-power message comprises an indication of the VTP, and wherein the indication of the VTP is usable by a second mobile station that receives the transmit-power message to determine the ITP for the second mobile station.

8. The method of claim 7, further comprising the first mobile station determining location information for the first mobile station, wherein the transmit-power message further comprises the determined location information for the first mobile station.

9. A method comprising:

at a second mobile station configured to operate in a radio access network, receiving a transmit-power message that was transmitted from a first mobile station, wherein the transmit-power message comprises an indication of a verified transmit power (VTP) for the first mobile station, wherein the VTP is a transmit power of an access probe when the first mobile station received an acknowledgement of an access probe from a base station, wherein the first mobile station initially transmitted the access probe to the base station at a predetermined initial transmit power (ITP) and then waited for the acknowledgement from the base station, and wherein, if the acknowledgement was not received from the base station within the predetermined period of time, the first mobile station repeatedly (i) increased the transmit power for the access probe, (ii) re-transmitted the access probe to the base station, and (iii) waited for the predetermined period of time, until the acknowledgement was received from the base station;

the second mobile station using the received indication of the VTP for the first mobile station as a basis for determining an ITP for the second mobile station; and the second mobile station transmitting an access probe at the ITP for the second mobile station.

10. The method of claim 9, wherein the transmit-power message comprises an indication of the predetermined ITP used by second mobile station.

11. The method of claim 9, wherein using the received indication of the VTP for the first mobile station as a basis for determining the ITP for the second mobile station comprises the second mobile station setting the ITP for the second mobile station equal to the VTP for the first mobile station.

12. The method of claim 9, wherein the transmit-power message comprises (i) an indication of a VTP for the first mobile station and (ii) location information for the first mobile station, the method further comprising:

the second mobile station determining location information for the second mobile station;

wherein using the transmit-power message as a basis for determining the ITP for the second mobile station comprises using (i) the indication of the VTP for the first mobile station, (ii) the location information for the first mobile station, and (iii) the location information for the second mobile station as a basis for determining the ITP for the second mobile station.

13. The method of claim 12, wherein determining location information for the second mobile station comprises using trilateration as a basis to determine location information.

14. The method of claim 12, wherein determining the ITP for the second mobile station comprises:

using the received location information for the first mobile station as a basis for determining a first distance between the first mobile station and a base station in the radio access network;

using the determined location information for the second mobile station as a basis for determining a second distance between the second mobile station and a base station in the radio access network; and using (i) a ratio between the second distance and the first distance and (ii) the VTP determined by the first mobile station, as basis for determining the ITP for the second mobile station.

15. The method of claim 12, wherein the received location information for the second mobile station comprises a first distance between the first mobile station and a base station in the radio access network;

wherein determining the location information for the second mobile station comprises determining a second distance between the second mobile station and a base station in the radio access network; and wherein determining the ITP for the second mobile station comprises using (i) a ratio between the second distance and the first distance and (ii) the VTP determined by the first mobile station, as basis for determining the ITP for the second mobile station.

16. The method of claim 9, further comprising:

making an initial determination that the ITP for the second mobile station has not yet been determined; and in response to the initial determination, listening for the transmit-power message.

17. The method of claim 16, further comprising, if a transmit-power message is not received within a predetermined period of time, using a predetermined ITP to send the access probe.

18. A system comprising:

data storage;

at least one processor; and program logic stored in the data storage and executable by the at least one processor to:

(a) cause a second mobile station to receive a transmit-power message that was transmitted by a first mobile station, wherein the transmit-power message comprises an indication of a verified transmit power (VTP) for the first mobile station, wherein the VTP is a transmit power of an access probe when the first mobile station received an acknowledgement of an access probe from a base station, wherein the first mobile station initially transmitted the access probe to the base station at a predetermined initial transmit power (ITP) and then waited for the acknowledgement from the base station, and wherein, if the acknowledgement was not received from the base station within the predetermined period of time, the first mobile station repeatedly (i) increased the transmit power for the access probe, (ii) re-transmitted the access probe to the base station, and (iii) waited for the predetermined period of time, until the acknowledgement was received from the base station;

(b) use the received indication of the VTP for the first mobile station as a basis to determine an initial transmit power (ITP) for the second mobile station; and (c) cause the second mobile station to transmit an access probe at the determined ITP.

19. The system of claim 18, wherein transmit-power message an indication of the ITP for the second mobile station as determined by the first mobile station.

20. The system of claim 18:
wherein the received transmit-power message further comprises location information for the first mobile station;
wherein the program logic stored in the data storage and executable by the at least one processor further comprises program logic stored in the data storage and executable by the at least one processor to:
(a) determine location information for the second mobile station; and
(b) use the indication of the VTP for the first mobile station, the location information for the first mobile station, and the location information for the second mobile station as a basis to determine the ITP for the second mobile station.

21. The system of claim 20, wherein the program logic stored in the data storage and executable by the at least one processor to determine the ITP for the second mobile station comprises program logic stored in the data storage and executable by the at least one processor to:
use the received location information for the first mobile station as a basis to determine a first distance between the first mobile station and a base station in the radio access network;
use the determined location information for the second mobile station as a basis to determine a second distance between the second mobile station and a base station in the radio access network; and
use (i) a ratio between the second distance and the first distance and (ii) the VTP determined by the first mobile station, as basis to determine the ITP for the second mobile station.

22. The system of claim 20, wherein the received location information for the second mobile station comprises a first distance between the first mobile station and a base station in the radio access network;
wherein the program logic stored in the data storage and executable by the at least one processor to determine the ITP for the second mobile station comprises program logic stored in the data storage and executable by the at least one processor to:
determine a second distance between the second mobile station and a base station in the radio access network; and
wherein the program logic stored in the data storage and executable by the at least one processor to determine the ITP for the second mobile station comprises program logic stored in the data storage and executable by the at least one processor to:
use (i) a ratio between the second distance and the first distance and (ii) the VTP determined by the first mobile station, as basis for determining the ITP for the second mobile station.

23. The system of claim 18, further comprising program logic stored in the data storage and executable by the at least one processor to:
based at least in part on the transmission of the access probe at the determined ITP for the second mobile station, determine a VTP for the second mobile station;
use the VTP for the second mobile station as a basis to generate a second transmit-power message, wherein the second transmit-power message is usable by a third mobile station that receives the transmit-power message to determine an ITP for the third mobile station; and
cause the second mobile station to broadcast the second transmit-power message.

24. A system comprising:
data storage;
at least one processor; and
program logic stored in the data storage and executable by the at least one processor to:
(a) determine a verified transmit power (VTP) for a first mobile station by:
transmitting an access probe to a base station in the radio access network and waiting for an acknowledgement from the base station, wherein transmit power of the access probe is initially set at a predetermined ITP;
if the acknowledgement is not received from the base station within the predetermined period of time, then repeatedly (i) increasing the transmit power, (ii) re-transmitting the access probe to the base station, and (iii) waiting the predetermined period of time, until the acknowledgement is received from the base station; and
determining the VTP to be the transmit power of the access probe when the acknowledgement is received from the base station;
(b) use the VTP as a basis to generate a transmit-power message, wherein the transmit-power message is usable by a second mobile station to determine an initial transmit power (ITP) for the second mobile station; and
(c) cause the first mobile station to send the transmit-power message to at least the second mobile station.

25. The system of claim 24, further comprising program logic stored in the data storage and executable by the at least one processor to use the VTP to determine the ITP for use by the second mobile station, wherein the transmit-power message comprises an indication of the determined ITP for use by a second mobile station.

26. The system of claim 24, wherein the program logic stored in the data storage and executable by the at least one processor to use the VTP to determine the ITP for use by the second mobile station comprises:
program logic stored in the data storage and executable by the at least one processor to use (i) the VTP for the first mobile station, (ii) location information for the first mobile station, and (iii) location information for the second mobile station as a basis to determine the ITP for the second mobile station.

27. The system of claim 24, wherein the transmit-power message comprises an indication of the VTP, and wherein the indication of the VTP is usable by a second mobile station that receives the transmit-power message to determine the ITP for the second mobile station.

28. The system of claim 27, further comprising further comprising program logic stored in the data storage and executable by the at least one processor to determine location information for the first mobile station, wherein the transmit-power message further comprises the determined location information for the first mobile station.

\* \* \* \* \*